United States Patent

[11] 3,540,367

[72] Inventor Franz W. R. Starp
 Calmbach, Black Forest, Germany
[21] Appl. No. 593,565
[22] Filed Nov. 10, 1966
[45] Patented Nov. 17, 1970
[73] Assignee Pronter-Werk Alfred Gauthier G.m.b.H.
 Calmbach, Black Forest, Germany
 a corporation of Germany
[32] Priority Nov. 27, 1965
[33] Germany
[31] P 38,220

[54] PHOTOGRAPHIC SHUTTER WITH ELECTRONIC TIMING DEVICE
 9 Claims, 3 Drawing Figs.
[52] U.S. Cl. .................................................. 95/53,
 95/11, 95/63
[51] Int. Cl. ................................................. G03b 9/22,
 G03b 9/62, G03b 15/00
[50] Field of Search......................................... 95/53,
 53(cl), 10, 63, 64, 62

[56] References Cited
UNITED STATES PATENTS
3,065,387 11/1962 Dean........................... 95/53X
3,348,460 10/1967 Schmitt........................ 95/10(C)
3,357,332 12/1967 Helber......................... 95/53

Primary Examiner—John M. Horan
Assistant Examiner—Joseph F. Peters, Jr.
Attorney—Arthur A. March ABSTRACT: A photographic camera provided with an electronic timing device having the time-determining components thereof contained within the shutter housing. The time-determining components of a resistance and capacitance wherein the resistance component is manually adjustable. A second set of resistances is provided in a separate housing and can be substituted in the circuit for those in the shutter housing so that the shutter speed is remotely adjustable.

INVENTOR
Franz W. R. Starp
BY Arthur A. March
ATTORNEY

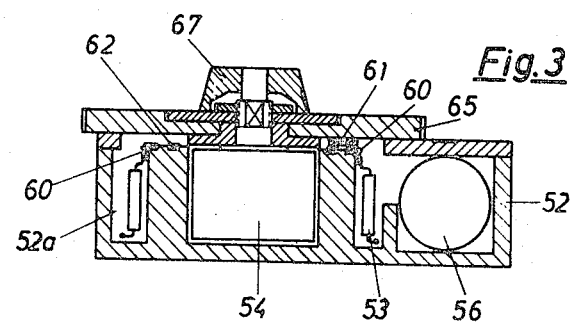
Fig. 3
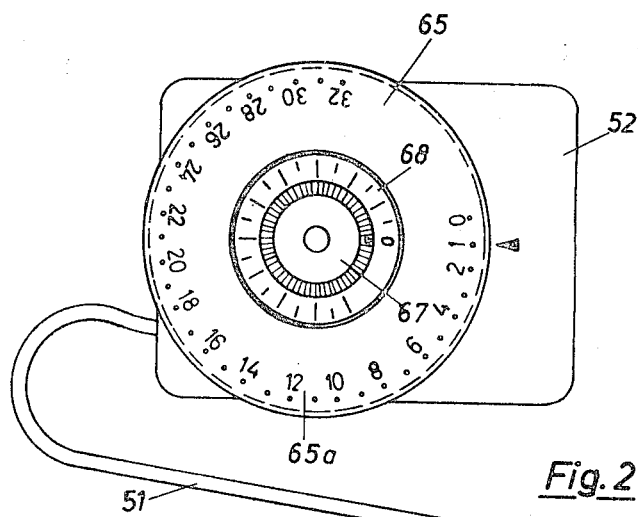
Fig. 2
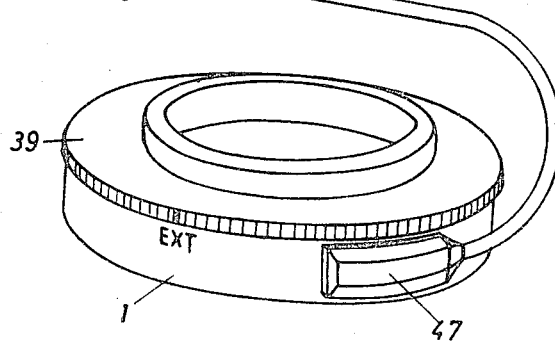

3,540,367

PHOTOGRAPHIC SHUTTER WITH ELECTRONIC TIMING DEVICE

This invention relates to a photographic shutter with an electronic timing device wherein the time-determining resistance capacitance unit or RC member is arranged in the shutter housing and can be set by means of a hand setter to different resistance values.

In photographic shutters with electronic timing devices of the present type it is known to provide different resistors which correspond with regard to their resistance value to the individual desired time values in order to obtain different exposures. The resistor corresponding to the selected exposure time is coupled by means of a time setter into the circuit of the electronic device.

As is well known, studio photographs, particularly color photographs and more particularly, those made for advertising purposes, require extremely accurate exposure settings, if the high standards for these photographs are to be met. It may happen that the photographer determines on the basis of tables and other factors an exposure time which simply cannot be achieved with a timing device of a shutter of the above type having graded fixed resistors. This inconvenience cannot be simply eliminated by replacing the fixed resistors of the time-building device by an infinitely variable resistor, because infinitely variable resistors have a relatively wide tolerance range increasing proportionally with the increase of the resistance value, and consequently are not useful, because of their inaccuracy as a regulating member, for obtaining accurate exposure times.

High accuracy infinitely variable resistors with a narrow tolerance range are already known, however these are so voluminous in their dimensions that they are not suitable for installation in a camera or in an attachment. Since the setting range of these devices extends, as known, over several revolutions, while the setting scale of a camera can only have an extension of a maximum of 360°, these devices are not suitable for use as regulating members.

It is an object of this invention to eliminate this inconvenience by providing time-regulating resistors included in the electronic timing device which are disconnectable, and instead, providing a connectable resistor combination consisting of several graded fixed resistors and an infinitely variable resistor bridging over the jumps of the resistance values. An advantage of this arrangement is that a camera equipped with an electronic timing device can be used to meet extreme requirements of accuracy of exposure time, which sometimes necessitate the setting of intermediate values of a time scale such as in the case of studio color photographs for advertising purposes and so forth. The invention is also based on the finding that a maximum of precision can be achieved in the regulating mechanism, which can be manufactured with a narrow tolerance range, that is, with minor deviations from the theoretical value upward or downward even in the range of high ohmic resistance values with simultaneous infinitely variable control of the regulating range.

From a manufacturing point of view, the arrangement according to the invention has the advantage of the easy adaptability of the regulating range of an infinitely variable electronic timing device to the respective requirements, since the possibility of arranging the fixed resistors in series permits a certain degree of freedom.

In order to obtain a simple setting of the regulating mechanism according to the invention, for which a linear setting scale is particularly suitable, it is also provided that the jump or difference between the fixed resistors is uniform and that the setting range of the infinitely variable resistor is adapted to the latter.

In order not to burden the construction of a camera additionally by the arrangement according to the invention of a regulating mechanism with several fixed resistors and an infinitely variable resistor, it is provided that the resistor combination may be arranged in a separate housing and connected by means of a separate cable with the electronic switching device. An additional advantage of the arrangement according to this invention can be achieved by arranging the battery for the electronic switching device in the housing receiving the resistor combination.

An embodiment of the subject of the invention is represented in the attached drawing in connection with an electronically controlled automatic shutter. Various other objects, features and advantages of this invention will be apparent from the following specification, claims and the drawing appended hereto wherein:

FIG. 2 shows a top view of the regulating device, connected to the shutter illustrated in a perspective view.

FIG. 3 is a cross-sectional view of the regulating device of this invention.

Figure 1:
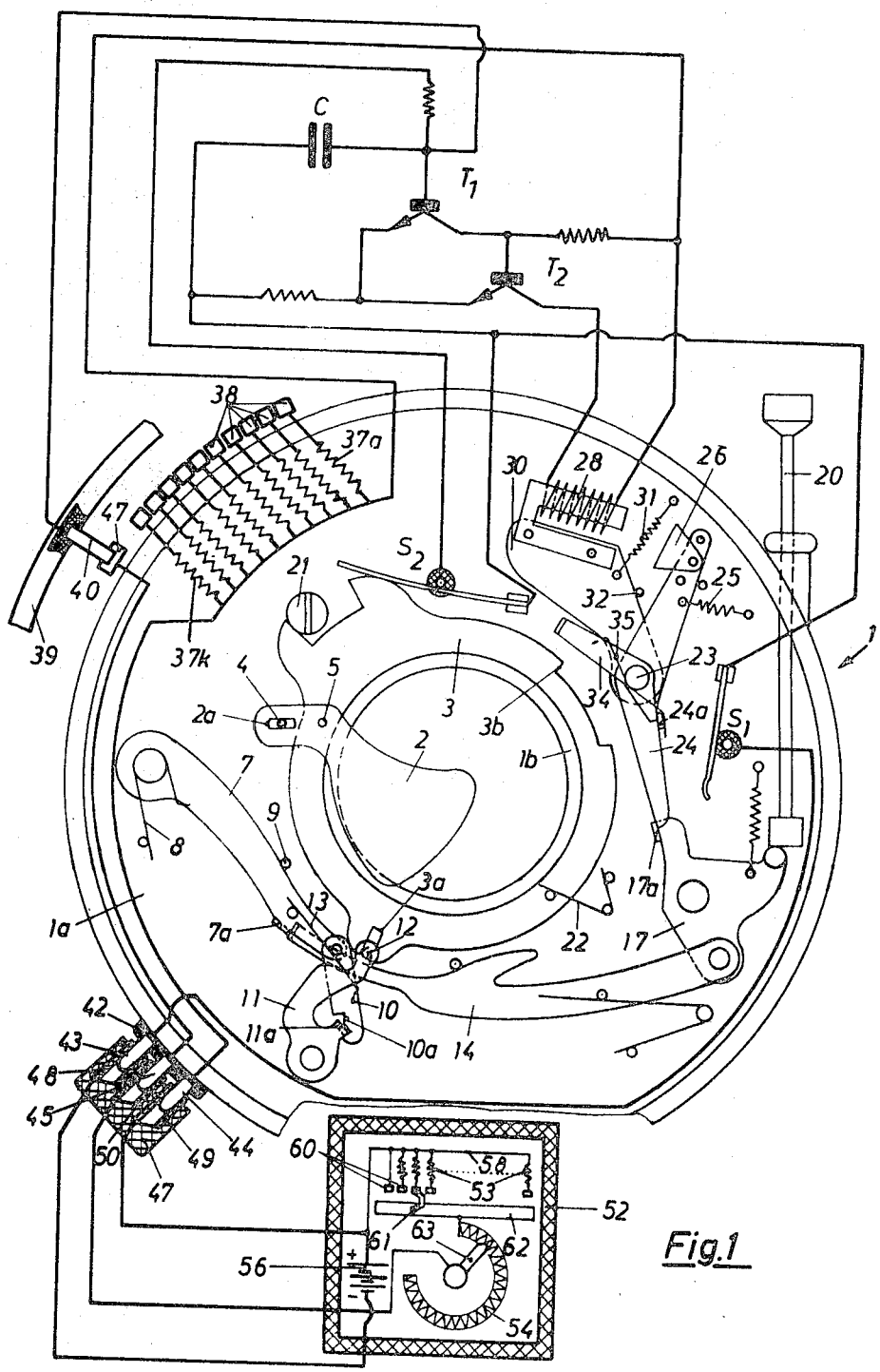
FIG. 1 is a partially diagrammatic view of the automatic shutter of this invention with the cover plate removed to illustrate the parts in the closed position. In addition, there is illustrated in a schematic representation, the electronic timing device with a time-setting and regulating mechanism permitting the setting of intermediate exposure time values.

Referring now to the drawings, reference numeral 1 denotes the housing of a photographic shutter, designed as an automatic shutter having a lower housing 1a provided with a concentric socket 1b for supporting a control ring 3 serving to drive several shutter blades 2, only one of which is shown for clarity of illustration. Each shutter blade is guided by means of a pinslot connection 4, 2a and supported by means of a journal 5 on the control ring 3.

In order to move the shutter blades 2 into the open and closed position, the ring 3 can be set into motion by a pivotally mounted lever 7, which, in starting position under the influence of the driving spring 8, bears on a stationary pin 9. The free end of the driving lever 7 is connected with a pivotally mounted pawl 10 having a coupling jaw 10a which cooperates with a bent-off lug 11a of a rotatably mounted intermediate lever 11, which in turn engages the control ring 3 by means of a pin slot connection 12, 3a. A coil spring 13 biases the parts 10 and 11 into engagement.

In order to move the driving lever 7 into the actuating position, a thrust pawl 14 is provided, which is articulated at one end on a pivotally mounted cocking-and-release element 17, while it engages at the other end a lug 7a of the driving lever 7 during cocking. The cocking-and-release element 17 is actuated by means of a release plunger 20 which is movably mounted in the shutter housing 1. Associated with the control ring 3 is a stationary stop 21 for limiting its rotary movements, and a spring 22 for securing it in the closing position during cocking.

This mechanical shutter blade drive can be operated by an electronic timing device in order to obtain different exposure times. For this purpose, a two-arm control lever 24 is provided, which is rotatably supported on a journal 23 and which under the action of a return spring 25 engages at one end a follower lug 17a on the element 17, and at the other end carries an armature 26 which cooperates with an electromagnet 28. A beveled top edge provided on the following lug 17a serves to permit the return of the cocking-and-release element 17 into the initial position even when the control lever 24 has already assumed its basic position. As illustrated in FIG. 1, the electromagnet 28 is arranged on a plage 30 which is pivotally mounted coaxially with the control lever 24 and bears on a stationary pin 32 under the action of a spring 31. The pin 23 also pivotally supports a locking lever 34 which by means of a spring 35 bears on a follower lug 24a of the control lever 24. The lever 34 is adapted to drop in front of a shoulder 3b of the control ring 3 in the open position of the shutter blades 2, thus blocking the mechanical driving device for the duration of the preset exposure time.

As it can be seen further from FIG. 1, the above mentioned electronic timing device is arranged as an emitter-coupled trigger, which contains two transistors $T_1$ and $T_2$, a condenser C and a number of graded fixed resistors 37a through 37j, which are adapted with regard to their ohmic value to exposure time values provided on a time setting scale. Each of the fixed resistors 37a to 37j is connected with a contact plate 38 and may be included in the circuit of the electronic timing device by means of an insulated sliding contact 40 arranged on the exposure time setter 39. For connecting the electronic timing device there is provided a contact switch $S_1$ which is positioned in the range of motion of the control lever 24 and which moves into the contact position shortly before the armature 26 is engaged with the electromagnet 28.

Associated with the electronic switching device is another contact switch $S_2$ which is influenced by the control ring 3 for the shutter blades 2. This contact switch 2 short circuits the condenser C in the starting position of the shutter, but opens it when the control ring 3 moves into the position corresponding to the open position of the shutter blades 2, causing the condenser to charge.

It can further be seen from FIG. 1 that a three-pole contact plug, consisting of an insulator 42 and three contact pins 43, 44, 45 secured therein, is arranged on the shutter housing 1, wherein contact pin 43 is electrically connected with the contact switch $S_1$, while the contact pin 44 is electrically connected with the fixed resistors 37a through 37j, the third contact pin 45 is connected with a contact plate 47 which is arranged in the shutter housing 1 as an extension of the contact plates 38 of the fixed resistances 37a through 37j, and which can be tapped by the contact slip ring 40 in a special position of the exposure time setter 39 designated on the housing with the letters "EXT".

In order to furnish intermediate values in the setting of exposure times, a provision is made so that the timing resistors 37a through 37j arranged in the shutter housing 1 can be disconnected and a combination resistor may be connected instead which consists of fixed resistor and of an infinitely variable resistor bridging over the jumps of the resistance values. This combination of resistors can also be arranged in the shutter housing 1 or, as shown in the drawing, in a separate housing which can be connected by means of a plug-coupling to the three-pole contact plug 42 to 45 on the side of the shutter. The plug-coupling also has three poles and consists of an insulator 47 and three contact sleeves 48, 49, 50. A three-wire cable 51 connects the plug-coupling 47 to 50 with the housing 52 to provide an infinitely variable exposure time settings.

As illustrated in the schematic representation in FIG. 1, a plurality of graded fixed resistors 53, an infinitely variable resistor 54 and a battery 56 are arranged in the housing 52. The battery 56 serves to supply current to the electronic timing device arranged in the shutter housing 1. Each of the poles of the battery are connected with one of the two contact sleeves 48 and 49 by the three-wire cable 51. On one side the fixed resistors 53 are connected by a common feed line 58 in parallel with the contact sleeve 49 and with the battery 56. On the other side, the resistors 53 are each provided with a contact plate 60. Associated with the contact plates 60 is a manually operated contact slipping 61, which is in constant contact with a slip tract 62 that is connected to one end of the variable resistor 54 having a manually adjustable sliding contact 63 connected with the contact sleeve 50 of the plug-coupling 47 to 50.

The fixed resistors 53 of this exposure time setter are uniformly graded in their resistance value, so that exposure time decreases or increases from one resistor to the other by the same amount, for example, by one second. The setting range of the variable resistor 54 corresponds to the constant difference between the fixed resistors 53, so that an infinitely variable setting is possible within the range between two fixed resistances and thus also of the entire exposure time setting range.

FIG. 2 and 3 illustrate a practical embodiment of the exposure time setting and regulating device represented schematically in FIG. 1. The fixed resistors 53 are arrange in an annular cavity 52a of the housing 52. On the housing 52 there is rotatably mounted an adjusting ring 65 which is provided with a scale 65a in the range from 0 to 32 seconds, and connected for rotation of the contact slipping 61. Rotatably mounted coaxially with the adjusting ring 65 is a knob 67 which serves to set the sliding contact 63 of the variable auxiliary resistor 54 and which can be set to a scale 68 subdividing the difference of the resistance value between two adjacent fixed resistors 53, for example, into ten units. When setting the knob 67 opposite the scale 68, it is possible to select values between the scale graduation, since the resistor set with this knob is infinitely variable.

The method of operation of the electronically controlled shutter described above and the application of the device attached thereto for the setting of infinitely variable exposure times are as follows:

First the setting is effected as usual by means of the exposure time setter 39 rotatably arranged on the shutter housing 1. In this case the exposure time setter 39 on the shutter side is moved into the desired position corresponding to the exposure time, by turning the sliding contact 40 clockwise connected with this setter 39 so that the sliding contact 40 leaves the contact plate 47 and is connected with one of the timing resistors 37a through 37j arranged in the shutter housing 1. In order to induct the electronic switching device, the battery 56 arranged in the exposure time setter 52 can be used, which feeds its current through the contact sleeves 48 and 49 connected with the contact pins 43 and 44 into the electronic switching device after the adjustment by means of the setter 39. The resistors 53 and 54 are provided in the exposure time setter are disconnected when the exposure time is set on the shutter side, since the connection between these resistors with the electronic switching device is interrupted when the exposure time setter 39 is reset.

In case the device 52 should be in the way when taking pictures with the exposure time setting on the shutter side, a battery arranged in its own housing and not represented in the drawing can be attached directly on the contact plugs 42 and 45, after removing the plug-coupling 47 to 50.

After the exposure time has been set by means of the setter 39, the plunger 20 is pressed down to effect the exposure, which results in a clockwise rotation of the cocking and release element 17. This movement turns the control lever 24 counterclockwise, thereby closing the switch $S_1$. The locking lever 34 is biased against the circumference of the control ring 3 and the armature 26 is engaged by the electromagnet 28. In addition, the rotary movement of the cocking-and-release element 17 results in the movement of the driving lever 7 into the cocking position due to the displacement of the thrust pawl 14 to the left with the intermediate lever 11 remaining at first in its initial position.

When the switch $S_1$ is closed, the transistor $T_2$ is controlling; consequently, a magnetic field is produced instantaneously in the electromagnet 28 so that the control lever 24 is held in blocking position against the action of the return spring 25, wherein the armature 26 bears on the magnet and the locking lever 34 rests on the control ring 3. At the end of the cocking operation the thrust pawl 14 is disengaged from the lug 7a of the driving lever 7, due to the action of a cam surface on the upper part of the pawl 14 which acts against a pin fixed to the lower housing 1a. Thereupon, the tight spring 8 imparts to the driving lever 7 a reverse rotation moving the control ring 3 into the open position by acting on the pawl 10 and the intermediate lever 11. When this open position has been attained, the locking lever 34 engages the shoulder 3b of the control ring 3, thus blocking the further movement of the mechanical drive.

Since the control ring 3 has already opened when the contact switch $S_2$ is actuated, the condenser C is charged from that moment on. When the condenser C has attained the base potential of the transistor $T_1$, the latter becomes charged and at this moment the transistor $T_1$ swells rapidly, due to the feedback of the two transistors $T_1$ and $T_2$, so that the transistor $T_2$ and thus the electromagnet 28 become currentless. The control lever 24 returns to its original position under the action of the return spring 25, and the locking lever 34 is disengaged from the control ring 3, which in turn moves the shutter blades 2 into the closed position. During the return of the control lever 24, the switch $S_1$ opens automatically while switch $S_2$ is closed again when the control ring 3 moves into the closing position.

If it is desired to take pictures at time setting values which cannot be achieved with the control device arranged on the shutter side, either because the desired exposure time is between the possible setting times or completely outside the available range, the above described time setting and control device can be used. A prerequisite, however, is that the exposure time setter 39 of the shutter must be moved first into the position designated with the letters "EXT". In this position, the sliding contact 40 touches the contact plate 47 connected electrically with the contact pin 45. The exposure time regulating resistors 37a through 37j arranged in the shutter housing are now disconnected from the circuit, while the resistors 53 and 54 of the exposure time setter 52 are included in the circuit of the electronic timing device.

To set the exposure time, the adjusting ring 65 must be turned until the desired time value contained in the scale 65a is opposite a fixed mark. In this operation the sliding contact 61 is moved into contact with the selected resistor 53, which is so laid out with regard to its ohmic resistance value that the provided exposure time is achieved in the subsequent operation of the electronic timing device. If under the given conditions the photographer must use an extremely precise intermediate value between two time values of resistors 53, he can use for the purpose the infinitely variable resistor 54 which is connected in series with the preset fixed resistor of the resistor series 53. The battery current is now conducted over the contact sleeves 48 and 49 and over the series connected resistors 53 and 54 as well as the contact sleeve 50 into the electronic switching device of the shutter assembly. When the setting is completed, the shutter can be released, which then operates in the manner described above.

It will be understood that the foregoing description with the details of exemplary structure is not to be construed in any way to limit the invention, but that modifications may be made thereto without departing from the scope of the invention as set forth in the following claims.

I claim:

1. A photographic shutter with an electronic timing device comprising a time-determining resistance-capacitance member arranged in the shutter housing and adjustable by manual means to different resistance values, the timing resistors of said RC member being included in the electronic timing device and disconnectable therefrom, and a resistor combination connectable in place of said timing resistors, said resistor combination having a plurality of graded fixed resistors and an infinitely variable resistor bridging over the jumps of the resistance values of said graded fixed resistors.

2. The photographic shutter of claim 1 wherein said jump between the said graded fixed resistors is uniform with the setting range of the infinitely variable resistor.

3. The photographic shutter of claim 1 wherein said resistor combination is in a separate housing and wherein said resistor combination is connectable by means of a cable to the electronic timing device.

4. The photographic shutter of claim 3 wherein a battery for the electronic timing device is disposed in said separate housing receiving said resistor combination.

5. A photographic shutter with an electronic timing device comprising: a shutter housing; a movable shutter blade mounted in said housing; a shutter blade operating mechanism mounted on said housing and connected to said shutter blade for moving said shutter blade between the open and closed position; an electronic timing device operably connected to said operating mechanism for holding said shutter blade in the open position until the set exposure time has elapsed, said electronic timing device including manually adjustable time-determining resistance-capacitance means disposed on said shutter housing for setting exposure time, wherein the timing resistors of said resistance-capacitance means included in the electronic timing device are disconnectable therefrom; and a variable resistance means connectable to said electronic timing device in place of said timing resistors to provide for setting of exposure time values not provided by resistors of said resistance-capacitance means and wherein said variable resistance means comprises: a plurality of graded fixed resistors and a variable resistor bridging the differences of the resistance values of said graded fixed resistors.

6. The photographic shutter of claim 5 wherein the differences between said graded fixed resistors are uniform with the setting range of said variable resistor.

7. The photographic shutter of claim 5 wherein said variable resistance means is disposed on said shutter housing.

8. The photographic shutter of claim 5 wherein said variable resistance means is disposed on a separate housing.

9. The photographic shutter of claim 8 wherein a battery for said electronic timing device is disposed on said separate housing.